US005378303A

United States Patent [19]

Traise

[11] Patent Number: 5,378,303

[45] Date of Patent: Jan. 3, 1995

[54] SINGLE PASS PRESSURE SEALER FOR PLANAR OR NESTED MEDIA

[75] Inventor: John E. Traise, Palm Bay, Fla.

[73] Assignee: Moore Business Forms, Inc., Grand Island, N.Y.

[21] Appl. No.: 913,528

[22] Filed: Jul. 15, 1992

[51] Int. Cl.⁶ .......... B32B 31/00

[52] U.S. Cl. .......... 156/555; 156/553; 156/292

[58] Field of Search .......... 156/290, 291, 292, 479, 156/548, 553, 555, 556; 100/93 RP, 153, 171; 493/206, 208; 271/225

[56] References Cited

U.S. PATENT DOCUMENTS

| | | | |
|---|---|---|---|
| 1,638,752 | 8/1927 | Sheldrick | 101/240 |
| 2,749,689 | 6/1956 | Colley | 53/124 |
| 3,152,800 | 10/1964 | Hanson | 493/342 X |
| 3,577,300 | 12/1969 | Glaze, Jr. et al. | 156/441.5 |
| 3,749,631 | 7/1973 | Batchelder et al. | 156/555 X |
| 3,959,567 | 5/1976 | Bradley | 156/555 X |
| 4,343,129 | 8/1982 | Gunther, Jr. et al. | 53/206 |
| 4,371,416 | 2/1983 | Denzin | 156/441.5 |
| 4,590,884 | 5/1986 | Kreeger et al. | 118/326 X |
| 4,802,949 | 2/1989 | Mitsam | 156/582 X |
| 4,826,475 | 5/1989 | Eweryd | 493/10 |
| 4,869,774 | 9/1989 | Wisbey | 156/582 X |
| 4,918,128 | 4/1990 | Sakai | 524/450 |
| 4,966,353 | 10/1990 | Lehmann et al. | 270/45 |
| 5,045,043 | 9/1991 | Brown et al. | 493/245 |
| 5,133,828 | 7/1992 | Jacques | 156/555 |

FOREIGN PATENT DOCUMENTS

| | | |
|---|---|---|
| 0153162 | 8/1985 | European Pat. Off. . |
| 421565A2 | 4/1991 | European Pat. Off. . |
| 575966 | 3/1946 | United Kingdom . |

*Primary Examiner*—Michael W. Ball

*Assistant Examiner*—James J. Engel

*Attorney, Agent, or Firm*—Nixon & Vanderhye

[57] ABSTRACT

A machine allows the production of pressure sealed business forms either by a "steam roller" effect for two ply forms, or by using a number of dual roller cassettes spaced from each other along axis of rotation when forms with inserts are handled. The first roller in each cassette, after sealing a portion of the leading edge of the form that it engages, will rock out of the way when engaged by the form at the insert, and then will drop back down and seal the trailing edge. The narrow width rollers of end cassettes will seal the longitudinal edges of the form. The stationary axis rollers that are common to both the "steam roller" and cassette embodiments have a dead-shaft construction, and are driven by a motor. Side frame plates mount all of the components, except the motor, within a housing, on rails, so that they can be easily moved out of the housing for changeover from one roller system to the other. The steam roller type idler rollers also have a dead-shaft construction and are suspended in the X, Y, and Z axes by leaf spring cantilevers.

28 Claims, 9 Drawing Sheets

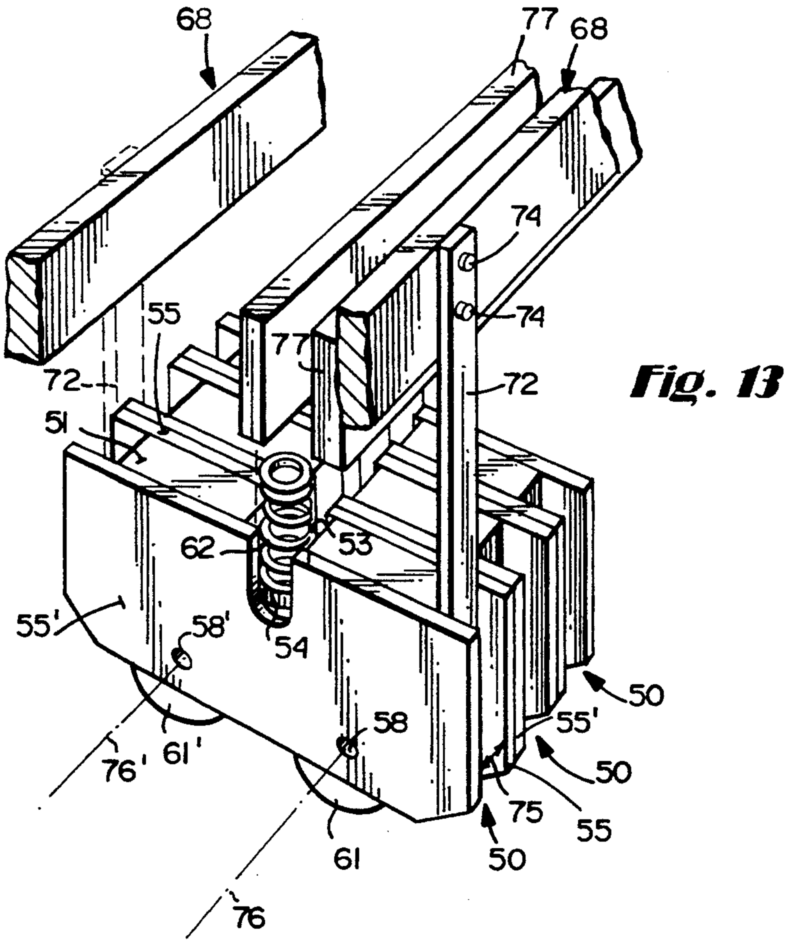
Fig. 13
Fig. 14
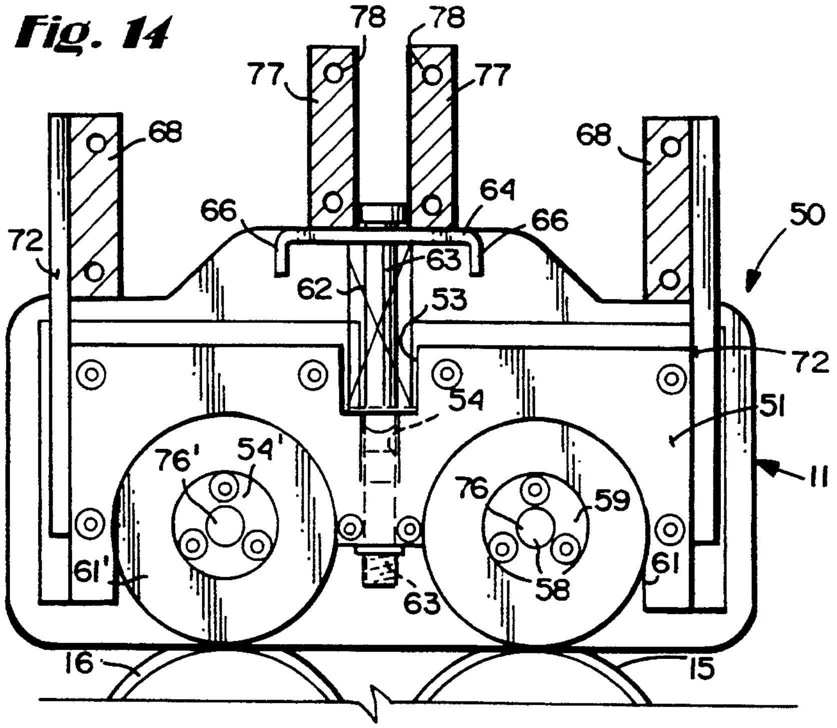

Fig. 18
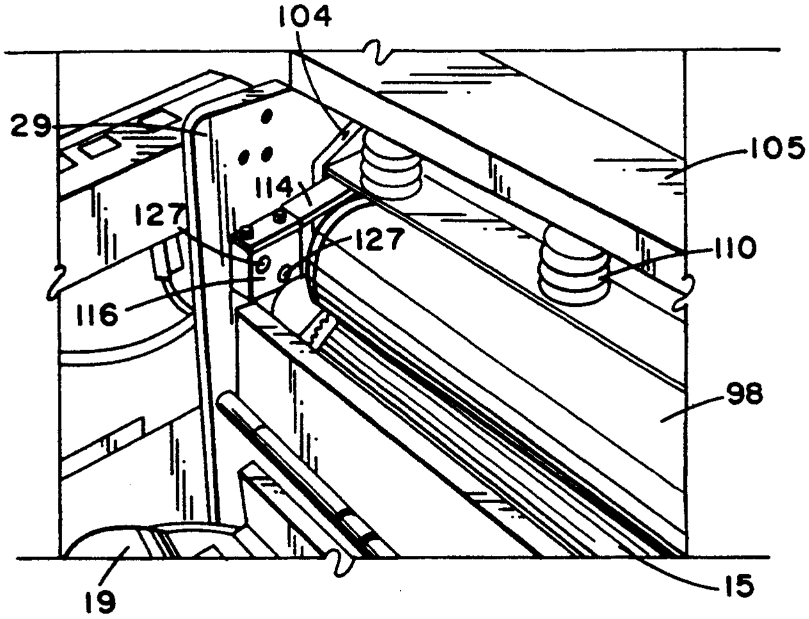
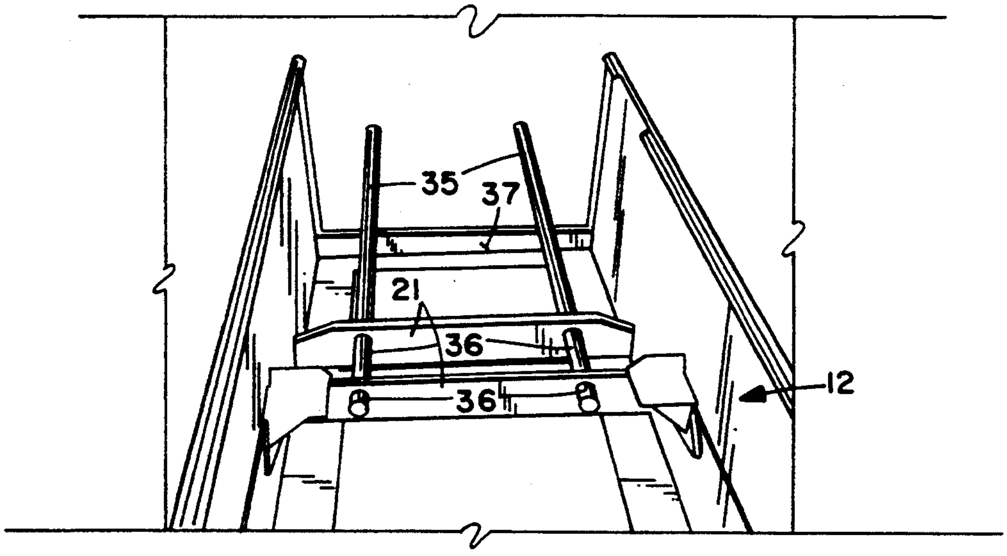
Fig. 19

SINGLE PASS PRESSURE SEALER FOR PLANAR OR NESTED MEDIA

BACKGROUND AND SUMMARY OF THE INVENTION

Because of numerous operational advantages, equipment for pressure sealing business forms, having pressure activated adhesive patterns thereon, have become increasingly popular. Two commercial systems that effect pressure sealing of business forms are the Moore 4800 equipment, sold by Moore Business Forms, Inc. of Lake Forest, Ill. ("Moore"), and the Moore-Toppan 870, sold by Toppan Moore of Japan.

The Moore-Toppan system uses two full width roll pairs to successively engage an advancing business form over the full face of the form. Such equipment is very effective for two ply business forms having pressure sensitive adhesive patterns disposed thereon, such as the pressure sensitive adhesive shown in U.S. Pat. No. 4,918,128, and such as sold by Toppan-Moore under the trade designation "TM 124". While such a system is very successful, it has components that are more massive than desired to apply a preferred pressure of at least about 100 pounds per lineal inch to the forms.

In order to handle business forms with inserts (and other surface interruptions such as labels, windows, etc.) the Moore 4800 system is utilized. The Moore 4800 design is based on perimeter sealing only, and uses two successive edge sealing mechanisms with a turn mechanism between the two sealer modules. While this machine is very effective, it requires more floor space than is desired, and requires close alignment with the folder or sheeter to which it is attached.

According to the present invention, a machine is provided that in a simple, low cost manner, allows one to have the product flexibility of the Moore 4800 (that is handling media with inserts, windows, unequal folds, labels, and other surface manifestations) without jamming or crushing of components of the forms, yet—when the forms being handled are two ply forms—allows the production of forms in the same way as the Toppan-Moore steam roller system, i.e. producing flat forms that have an aesthetically pleasing appearance when stacked and sorted. The invention also allows these desirable end results to be accomplished without requiring the comparatively high floor space area of the Moore 4800 (all edges of forms, even with inserts, being sealed in a single pass), and provides a lower cost alternative to the massive Moore-Toppan 870.

According to one aspect of the present invention, an apparatus for sealing pressure sensitive adhesive patterns on business forms and that can produce very flat aesthetic two ply forms, yet—after conversion—can handle forms with inserts, in a single pass, comprises the following elements: First and second rollers mounted for rotation about substantially parallel first and second stationary axes, respectively, the rollers each having an axial length of at least about five inches. Means for rotating the first and second rollers about said first and second axes. Main frame means for mounting a plurality of idler rollers in association with the first and second rollers so that the idler rollers cooperate with the first and second rollers to apply a compressive pressure to business forms passing between them of at least about 100 pounds per lineal inch. A first idler roller assembly for cooperation with the main frame means, comprising: Third and fourth rollers mounted for rotation about substantially parallel third and fourth axes, which are parallel to the first and second axes, each of the third and fourth rollers having an axial length of at least about five inches; and spring means for applying spring pressure to the third and fourth rollers which provides the compressive pressure to business forms. And, a second idler roller assembly for cooperation with the main frame means in place of the first idler roller assembly, the second idler roller assembly comprising: At least three narrow width roller couples, the rollers of the narrow width roller couples being mounted on common and sixth axes, parallel to the first and second axes, the roller couples being spaced along the fifth and sixth axes; spring means for applying spring pressure to each of the roller couples which provides the compressive pressure to business forms; and means for mounting the couples so that a roller from each of the plurality of couples cooperates with each of the first and second rollers, and so that business forms with inserts, labels, windows, or other surface interruptions without damage to the business forms.

A conveyor may be provided for conveying business forms into operative association with the first roller. A housing is also preferably provided with various components mounted in one or more discrete units, and the discrete units are mounted within the housing—such as on a plurality of rails mounted in stationary bushings, at least some of which are open-top—for movement into and out of the housing.

Typically, the first and second rollers are "deadshaft" construction rollers, with a non-rotating support shaft that is as short as possible to reduce deflection due to spring load. In this construction, the rollers are hollow and have a central stationary shaft, with roller bearings disposed between the hollow interior of the roller and the stationary shaft. A gear is connected to at least one end of each of the rollers and the motor, through gearing means, drives the rollers.

According to another aspect of the present invention, an apparatus for sealing pressure sensitive adhesive patterns on business forms is provided which can handle business forms with inserts, or having other surface interruptions. This apparatus comprises: First and second stationary axis rollers mounted for rotation about substantially parallel first and second stationary axes, respectively. Main frame means for mounting a plurality of idler rollers in association with the first and second rollers so that the idler rollers cooperate with the first and second rollers to apply a compressive pressure to business forms passing between them of at least about 100 pound per lineal inch. An idler roller assembly mounted on the main frame means and comprising: at least three narrow width roller couples, the rollers of said narrow width roller couples being mounted on common third and fourth axes, parallel to the first and second axes, the roller couples being spaced along the third and fourth axes; spring means for applying spring pressure to each of the roller couples which provides the compressive pressure to business forms; and means for mounting the couples so that a roller from each of the plurality of couples cooperates with each of the first and second rollers, and so that business forms with inserts, labels, windows, or other surface interruptions without damage to the business forms. And, means for mounting the idler roller assembly to the main frame means so that the positions of at least two of the narrow width roller couples are adjustable along the third and fourth axes so as to allow proper positioning of the at least two couples along the edges of business forms in the direction of travel through the apparatus.

The narrow width rollers typically have an axial extent of between about 0.1 and one inch. Each couple comprises a center body defining a of ball bearing races, a pair of side plates, and a pair of narrow width ball bearing rollers mounted within the races and mounted for rotation about third and fourth axes by arbors mounted to the side plates. Each couple also further comprises means for defining a spring mount in the center body at a central portion thereof between the races, a bore extending into the center body at the spring mount in a direction perpendicular to the third and fourth axes for receipt of a screw, and a spring backer. A coil spring is mounted in the spring mount with a first end thereof abutting the center body, while the spring backer engages the coil spring on a second end thereof opposite the first end. The screw passes through the spring backer. The frame means engages the spring backer.

The couples are mounted by, for each couple, first and second positioning bars engaging opposite ends of the center body to prevent substantial movement in a first direction perpendicular to the third and fourth axes, but to allow movement in the second direction perpendicular to the third and fourth axes. A pair of cross bars engage the spring back plate so that movement in the second direction will be against the bias of the coil spring, and the positioning bars and cross bars are connected to the main frame means, the positioning bars being connected via a locator plate with numerous holes therein to allow adjustment of the position of the couples with respect to each other and the forms to be handled.

The invention also relates to individual cassettes for the pressure sealer described immediately above. The cassettes per se, which comprise the roller couples, include the center body, side plates, narrow width ball bearing rollers, and arbors, as well as a coil spring, screw, and spring backer.

The invention also comprises the particular unit for, in a low cost manner, effecting "steam roll" sealing of two part forms with pressure sensitive adhesive. The apparatus according to this aspect of the present invention comprises: First and second stationary axis rollers mounted for rotation about substantially parallel first and second stationary axes, respectively. Main frame means for mounting a plurality of idler rollers in association with the first and second rollers so that the idler rollers cooperate with the first and second rollers to apply a compressive pressure to business forms passing between them of at least about 100 pound per lineal inch. And, a first idler roller assembly for cooperation with the main frame means, comprising: third and fourth hollow rollers mounted for rotation about substantially parallel third and fourth axes, which are parallel to the first and second axes, each of the third and fourth rollers having an axial length of at least about five inches; spring means for applying spring pressure to the third and fourth rollers which provides the compressive pressure to business forms; a frame module comprising a pair of side supports; and means for mounting the third and fourth rollers for rotation about the third and fourth axes, comprising a pair of stationary shafts mounted to the side supports and one disposed within each of the hollow third and fourth rollers, and bearing means disposed within the hollow third and fourth rollers between the stationary shafts and the third and fourth rollers.

The main frame comprises first and second side plates, and the idler roller assembly further comprises a generally T-shaped bar associated with each of the third and fourth rollers, and extending between the first and second side plates. A cross support of the frame module; and locating means formed in the T-shaped bars and the frame module cross support for receiving the spring means (typically at least four, and normally six, symmetrically spaced coil springs) therein. A plurality of leaf springs suspend the stationary shafts in X, Y and Z axes, which allow adjustment or movement in the X and Y planes with no frictional restraint.

The invention also contemplates a method of sealing perpendicular first and second edges of a business form having top and bottom sheets and an insert between them with pressure sensitive adhesive strips disposed along the face and second perpendicular edges of the top and bottom sheets, and along the third edge parallel to the second edge, in a single pass through a machine having at least three narrow width rollers mounted for rotation about an axis parallel to the first edge of the business form, the rollers spaced from each other along the axis of rotation, and two of the rollers comprising end rollers spaced apart from each other along the axis a distance substantially equal to the length of the first edge between the second and and third edges. The method comprises the following steps: (a) Feeding the business form in a first direction, parallel to the second and third edges, so that the first edge of the business form is engaged by the at least three rollers. (b) Applying pressure to the rollers so that they effect sealing of the pressure sensitive adhesive of the business form wherever the rollers engage the business form. (c) Aligning the business form with respect to the rollers so that the end rollers engage the second and third edges of the form and effect pressure sealing along the entire length thereof as the form passes in the first direction. And, (d) causing the rollers, after engaging the first edge of the form and effecting sealing thereof where engaged by a roller, to rock out of the way of the form insert if a portion of the form containing the insert engages the roller, so that the insert and the form at the insert will not be crushed.

Step (b) is typically practiced by applying a pressure of at least 100 pounds per lineal inch, and more typically between 150 and 250 pounds per lineal inch (e.g. about 200 lbs. per linear inch). Also there typically are a plurality of rollers between the end rollers. Also, the business form typically has a fourth edge, parallel to the first edge, and pressure sensitive adhesive is disposed along the first and second sheets at the fourth edge. There is also the further step (e) of causing the rollers, after being rocked out of the way by the form insert, to engage the fourth edge of the business form and effect sealing thereof where engaged by a roller.

The business form produced by the method described above is also unique. While the normal business forms produced utilizing the Moore 4800 and the Moore-Toppan 870 have the pressure sensitive adhesive sealed along the entire length of all four edges thereof, or in some circumstances have only interrupted strips of adhesive along one or more of the edges which are then sealed only at those interrupted strips, the business form according to the invention has pressure sensitive adhesive disposed along the entire length of all of the edges, but on the two edges that are transverse to the direction of movement of the insert-containing business form through the machine (as described in the above method), those edges will be sealed only at regularly spaced discrete portions along the length thereof, despite the existence of the pressure sensitive adhesive along the entire length. It has been found that this construction is totally acceptable for all normal purposes, as long as the longitudinal edges of the form (those edges in the direction of movement of the form through the machine) are sealed along the entire length, the regularly spaced discrete portions sealed along the transverse edge do not in any way adversely affect the integrity of the form. The discrete portions are typically each less than one inch long and greater than 0.1 inches long (i.e. have a length corresponding to the axial extent of the narrow width rollers of the cassettes).

It is the primary object of the present invention to provide a highly versatile, low cost, alternative to conventional steam roller or two-pass pressure sealing machines, as well as a simple but unique method, for producing pressure sealed business forms with inserts, and the forms so produced. This and other objects of the invention will become clear from an inspection of the detailed description of the invention and from the appended claims.

BRIEF DESCRIPTION OF THE DRAWINGS

FIG. 5 is a side view of an exemplary rail support bar used in the machine of FIG. 1, while

FIG. 8 is a side view of the central body of the cassette illustrated in FIG. 7, shown in association with a spring, cap screw, and spring backer;

FIG. 13 is a schematic perspective view, with portions cut away for clarity of illustration, showing the manner of mounting of the cassettes in the machine of FIG. 1;

FIG. 14 is a schematic side view, partly in cross-section and partly in elevation, and with the near side plate of the cassette removed for clarity of illustration, showing further details of the mounting of the cassettes in the machine of FIG. 1;

FIG. 18 is a detail perspective view of a portion of one of the top "steam roll" rollers of the FIGS. 16 and 17 embodiment shown in association with the frame means in the housing; and FIG. 19 is a top partial perspective view showing a housing for the machine of FIG. 1 and with the support rails fully extended out of the housing, in the position they would assume if the sealer were removed from the housing in order to change over from one idler roller configuration to another.

DETAILED DESCRIPTION OF THE DRAWINGS

Figure 1:
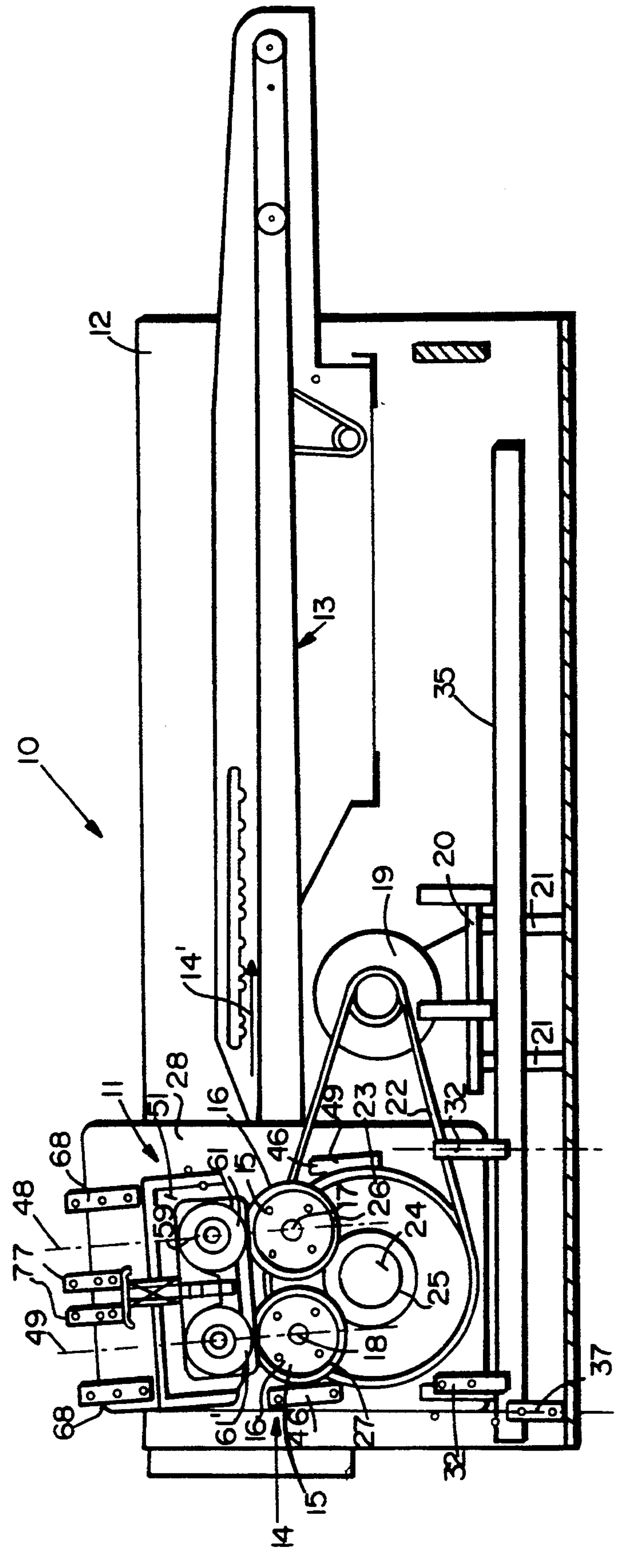
FIG. 1 is a side view, with the near end of the housing removed for clarity of illustration, of an exemplary machine according to the present invention, shown with the insert-handling idler roller assembly.

An exemplary machine for sealing pressure sensitive adhesive patterns on business forms, according to the present invention, is shown generally by reference numeral 10 in FIG. 1. The machine 10 is typically made of metal, and is shown with an idler roller assembly 11 that is designed to be used with business forms having inserts or other surface interruptions such as labels, windows, or uneven folds, and to effect sealing thereof in a single pass. According to one aspect of the present invention, however, the assembly 11 may be replaced with another idler roller assembly which is used to "steam roll" two ply forms, to produce very flat and aesthetically pleasing forms. Either idler roller assembly may be used with the same other components of the machine 10.

COMMON HOUSING, FRAME, AND LOWER ROLLERS

The machine 10 includes a housing 12, receiving forms to be acted upon in direction 14; and a conveyor assembly 13 for conveying business forms to that have been acted upon in the direction of arrow 14'. The conveyor 13 may be any suitable conveyor and does not form a part of the present invention. The machine 10 further comprises a first roller 15 and a second roller 16 which are mounted for rotation about substantially parallel first and second stationary axes 17, 18 respectively. The rollers 15, 16 are axially elongated, having an axial length of at least about five inches, and typically about eleven inches, in order to handle all conventional sizes of business forms. The elongated nature of the rollers 15, 16 is made clear in FIG. 17, which illustrates roller 15 in longitudinal cross-section.

The rollers 15, 16 are preferably powered rollers, being driven so that once a form is moved into contact therewith it is powered by the rollers 15, 16 in the direction of arrow 14. The means for rotating the rollers 15, 16 includes a motor 19 which preferably is stationarily mounted on a pedestal 20 to a pair of cross supports 21 for the housing 12 (see FIGS. 1 and 19). The motor 19 is connected by a drive belt 22 to a pulley 23 mounted on a common shaft 24 with a gear 25. The gear 25 engages gears 26, 27 provided at at least one end of each of the first and second rollers 15, 16. Gears can be provided at both ends of the rollers, cooperating with like gears 25, if desired (e.g. see gears 26, 26' in FIG. 17).

Figure 2:
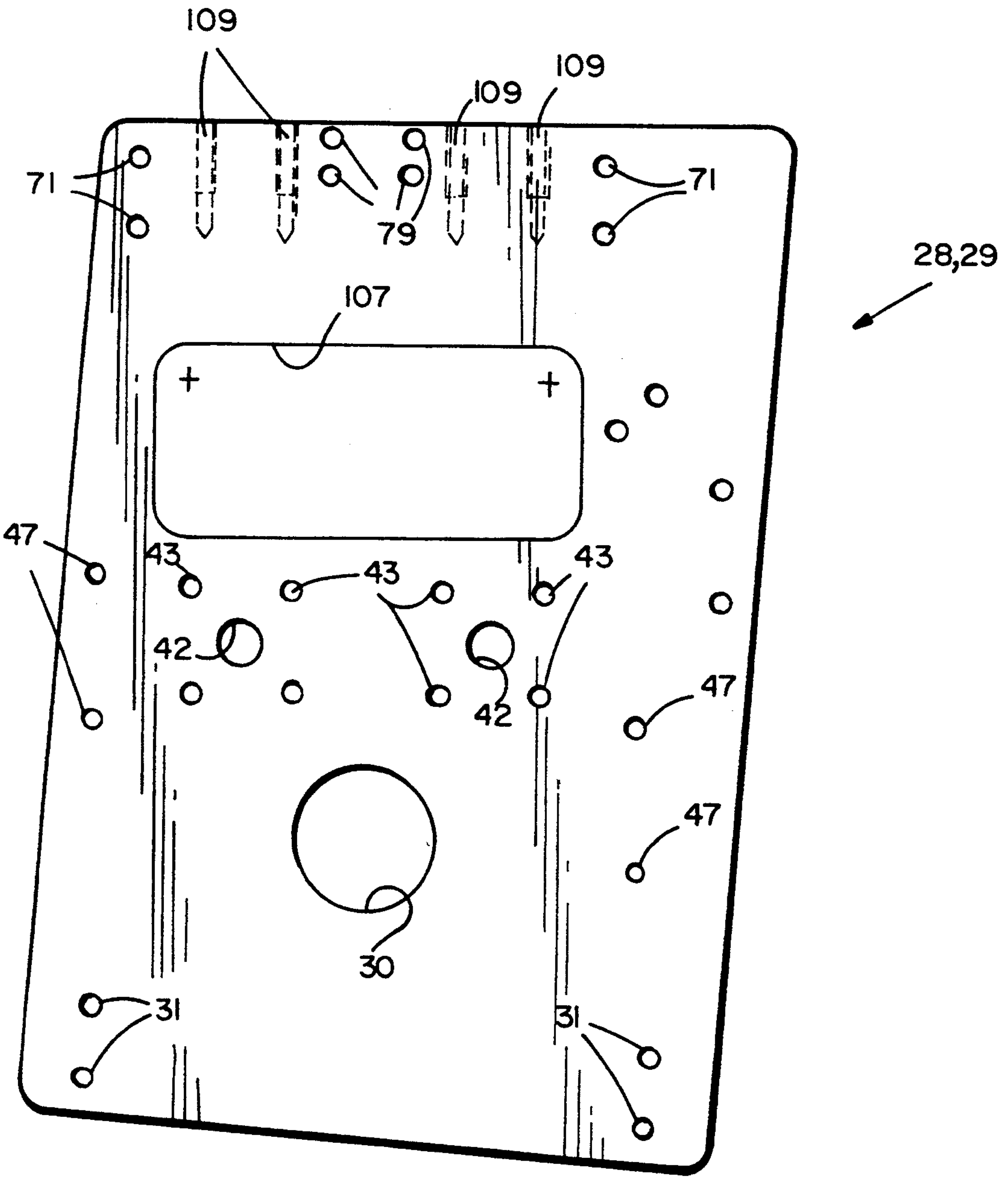
FIG. 2 is an elevation view of one of the side plates of the frame of the machine of FIG. 1.
Figure 4:
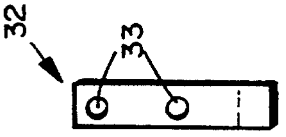
FIG. 4 is an end view of that bar.
Figure 3:
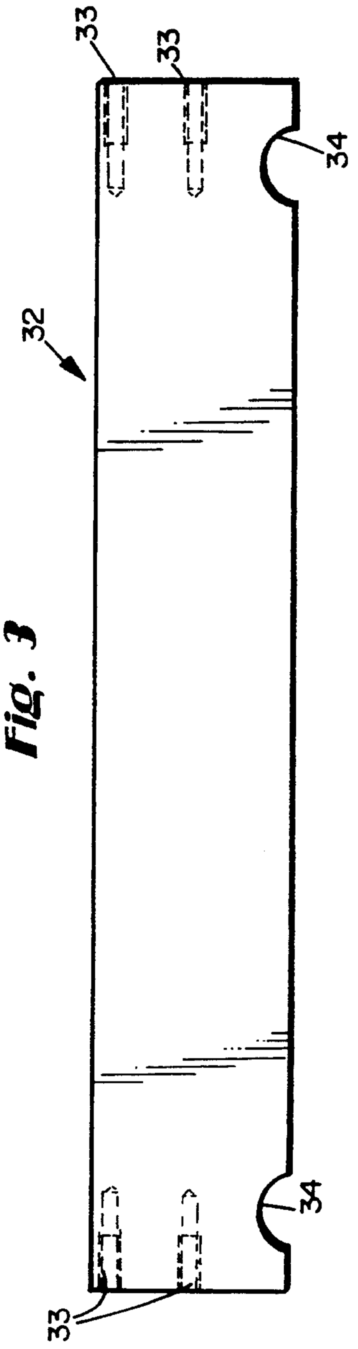
FIG. 3 is a side view of one of the module support bars of the machine of FIG. 1.
Figure 6:
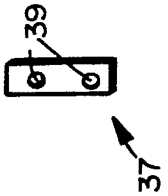
FIG. 6 is an view of that bar.
Figure 5:
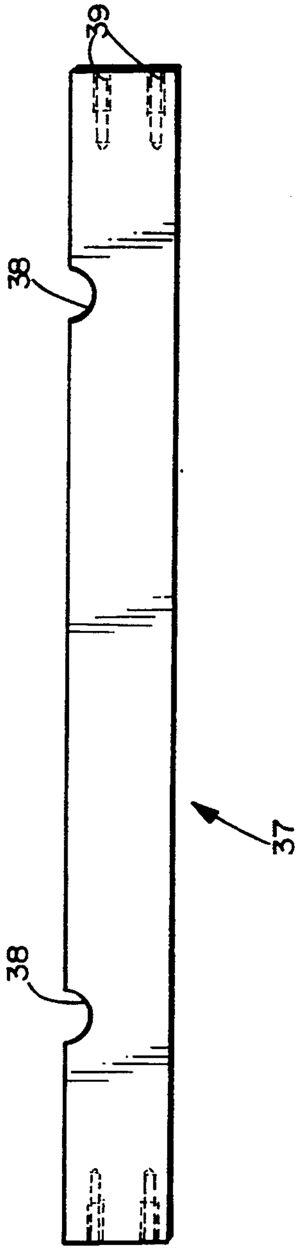
Figure 7:
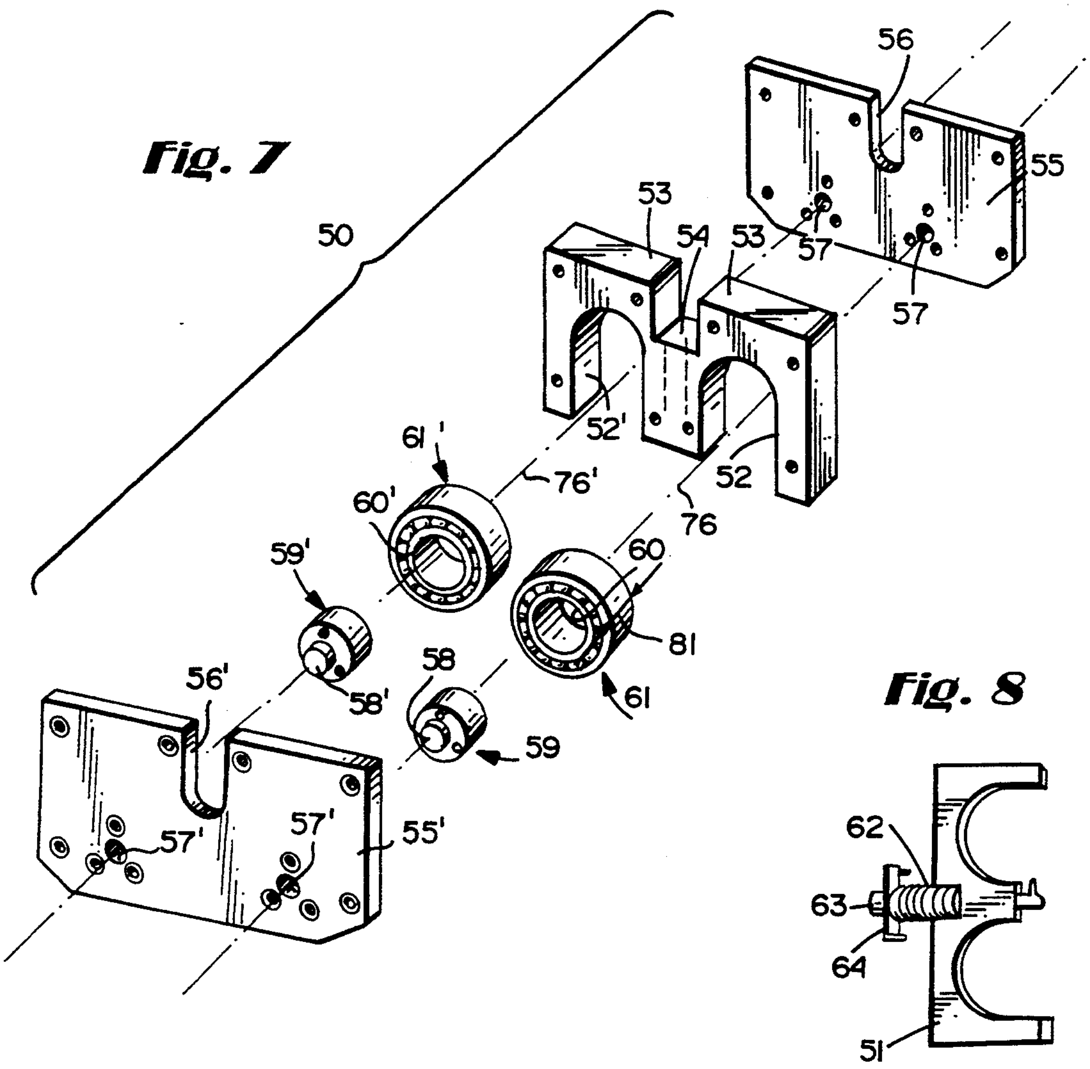
FIG. 7 is an exploded perspective view of most of the components of a pressure sealer cassette of the machine of FIG. 1.

The machine 10 also comprises a main frame means, which may include an integral unit mounting the shaft 24, rollers 15, 16, idler roller assembly 11, and the like thereon for movement in and out of the housing 12 to effect changeover of the idler roller assembly 11, or repair of the unit. The preferred main frame means comprises first and second side plates 28, 29 seen in FIGS. 1, 2, and 17. The side plates 28, 29 include a plurality of openings therein for receipt of various components of the rollers 15, 16, rotating means, and idler roller assemblies, such as assembly 11. For example, the openings 30 (one formed in each of the plates 28, 29) receives a bearing supported shaft 24 therein, while the openings 31 receive bolts connecting the plates 28, 29 to module support bars 32 (see FIGS. 1, 3, and 4), receiving bolts (not shown) that go into the tapped holes 33 in the ends of the support bars 32. The support bars 32 have, at the bottoms thereof, open semi-circular grooves 34, about one inch in diameter, that are supported by a pair of circular in cross-section rails 35 (see FIGS. 1 and 19). The rails 35 are in turn supported by bushings 36 (see FIG. 19) in the support bars 21, and by another support bar 37 at the outlet end of the housing 12. The support bar 37 (see FIGS. 1, 5, 6, and 19) has bushings 38 in the top surface thereof that are semi-circular, and open at the top, so that the plates 28, 29, and all the structures mounted thereon, may move completely out of the discharge end of the housing 12. FIG. 19 shows the rails 35 moved to a position where the structures supported thereby would be entirely exterior of the housing 12. The support bars 37 (see FIGS. 5 and 6) have tapped holes 39 therein through which bolts extend connecting the support bars 37 to the sides of the housing 12. Also (although not shown) the ends of the rails 35 closest to the open, discharge, end of the housing 12 are tapped so that they can be bolted to whatever folder or other precedent piece of forms handling equipment is to be associated with machine 10.

Figure 17:
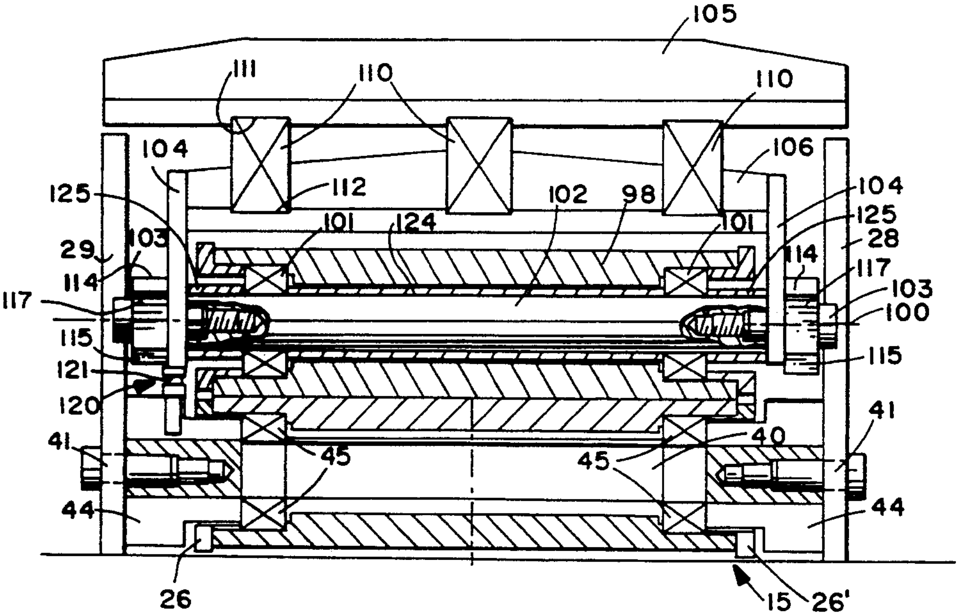
FIG. 17 is an end view, partly in cross-section and partly in elevation, of the steam roller design of FIG. 16, and also showing the construction of a bottom, drive roller.

The first and second rollers 15, 16 preferably have "dead shaft" constructions. As illustrated in FIG. 17, this means that the rollers 15, 16 are hollow and have a stationary shaft 40 extending through each, and connected by bolts 41 at either end thereof to the side plates 28, 29. The openings in the side plates 28, 29 for receiving the bolts 41 for the rollers 15, 16, are shown by reference numerals 42 in FIG. 2. The surrounding holes 43 are provided for receipt of bolts which connect two steel collars 44 (see FIG. 17) so that the section modulus becomes much greater than than the modulus of the shaft 40 alone, reducing deflection of the shaft assembly. This increased stiffness provides roll closure relief which is desired to reduce the drive torque required to feed a document/business form into the high pressure roll nip.

With this construction, bearings 45 are mounted interiorly of the rolls 15, 16 (see FIG. 17), the rolls 15, 16 rotating about the bearings 45, which in turn engage the stationary shaft 40. Since the bearings 45 are inside the rolls, the "effective" lengths of the shafts 40 are as short as possible, reducing deflection due to spring loading.

In order to provide further rigidity to the discrete unit which comprises the main frame means (side plates 28, 29), cross supports 46 (see FIG. 1) are provided, the cross supports being attached by bolts received by the openings 47 (see FIG. 2) in the side plates 28, 29.

MULTIPLE CASSETTE EMBODIMENT

What has been described so far is the common base, drive, unit for both constructions of sealing machine according to the invention. Now the idler roll assembly 11, which is used with business forms having inserts, will be described.

The assembly 11 is made up of a plurality of individual cassettes or roller "couples", each cassette having two rollers spaced from each other in the direction of arrow 14, and rotatable about parallel axes, and axes that are parallel to the axes 17, 18, and aligned with them, as indicated by the center line alignments 48, 49 illustrated in FIG. 1. A plurality of cassettes are provided, as many as desired to effect the appropriate sealing, and to accommodate a wide variety of different form dimensions in the dimension perpendicular to the direction 14.

Major components of a typical cassette, referenced generally by reference numeral 50, are illustrated in FIGS. 7 through 9 and 13. Cassette 50 includes a center body 51 having a pair of semi-circular open ended bearing races 52, 52' (see FIG. 7) therein. On the opposite side of the center body 51 from the open ends of the races 52, 52' is a spring mount 53, with a through-extending bore 54 being provided in the body 51 extending from the spring mount 53 to the side of the center body 51 having the races 52, 52'.

The cassette 50 further comprises side plates 55, 55' connected to opposite faces of the center body 51, and having cut outs 56, 56' therein corresponding to the spring mount 53. They also each have a pair of openings 57, 57', therein for receipt of the shaft stubs 58, 58' of arbors 59, 59'. The arbors 59, 59' are received within the central openings 60, 60', of ball bearing rollers 61, 61', the roller 61 being received within the race 52, and the roller 61' within the race 52'. The ball bearing roller 61, 61' extend out past/beyond the side plates 55, 55' in the center body 51 so as to engage the rollers 15, 16 and business forms therebetween, as illustrated in FIGS. 1, 13, and 14.

Figure 9:
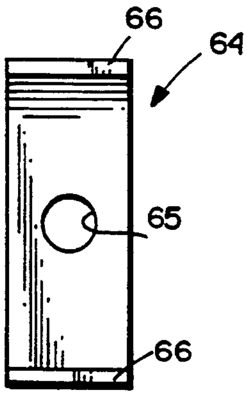
FIG. 9 is a front view of the spring backer illustrated in FIG. 8.

As seen most clearly in FIGS. 8, 13, and 14 the spring mount 53 mounts a coil spring 62 therein, the central opening through the spring 62 being in alignment with the bore 54, and a screw 63 extending through the center passageway in the spring 62, and through the bore 64, out the other end of the body 51. One end of the spring 62 engages the spring mount 53, while the other end engages a spring backer 64 (FIGS. 8, 9 and 14). The backer 64 is a strip of metal having a through-extending opening 65 therein for receipt of the screw 63, and typically down turned edges 66 (see FIGS. 9 and 14). The head 67 of the screw 63 (see FIG. 14) engages the "top" of the backer 64, on the opposite side thereof as the spring 62. Preferably, the bore 54 is screw threaded to receive the exterior screw threads of the screw 63 so that by rotating the screw 63, by grasping the head 67, the compression spring 62 can be unloaded (by closing the position between the spring backer 64 and the top of the center body 51).

Figure 10:
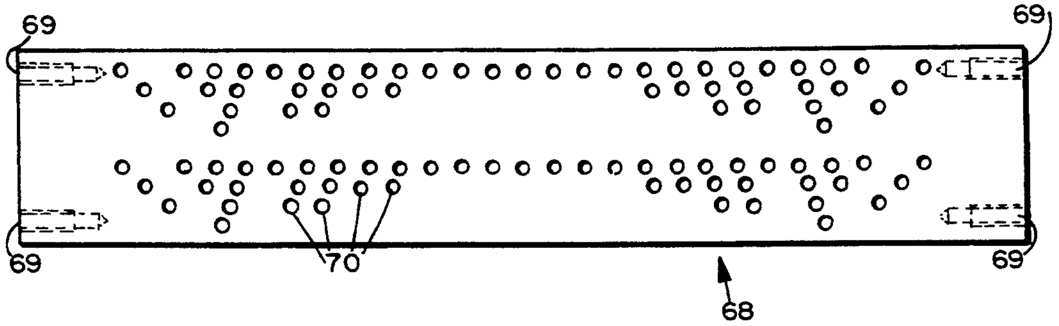
FIG. 10 is a front view of an exemplary locator plate utilized with the machine of FIG. 1.
Figure 11:
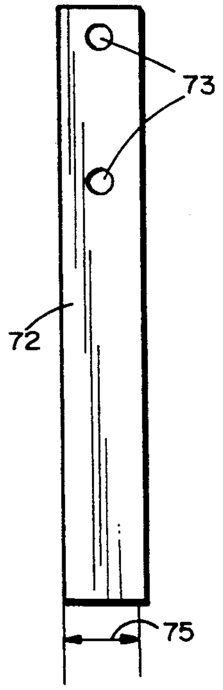
FIG. 11 is a front view of an exemplary positioning jib for laterally positioning the cassettes of FIG. 7 in association with the locator plate of FIG. 10 in the machine of FIG. 1.
Figure 12:
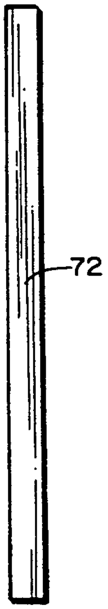
FIG. 12 is a side view of the same positioning bar.

The manner in which each of the cassettes 50 mounted to the main frame side plates 28, 29 is best seen from FIGS. 10 through 14. FIG. 10 shows a locator plate 68 having tapped openings 69 at the ends thereof, and numerous through-extending openings 70 through the thickness thereof. A pair of locator plates 68 are provided, as seen in FIGS. 1 and 14, they are connected by bolts (not shown) extending through the opening 71 (see FIG. 2) in the side plates 28, 29.

Connected at numerous locations along the 68, via openings 70, are a plurality of positioning bars 72. The positioning bars 72, most clearly seen in FIGS. 11 through 14, have a pair of openings 73 at the "top" thereof for connection by bolts 74 (see FIG. 3) through holes 70 in a locator plate 68. The width 75 of each positioning bar 72 is equal to the width of the spacing between the side plates 55, 55' of a cassette 50. The positioning bars 72 thus engage the ends of the body 51, holding the cassette 50 in place. However, there is no means of attachment of the bars 72 to the cassette 70 so there is freedom of movement in at least some modes of the cassettes 50 with respect to the main frame plates 28, 29.

Note that preferably the cassettes 50 are placed (see FIG. 13) right next to each other so that the side plate 55 of one tolerably locates the side plate 55' of another to be at minimum clearance; that is, the side of one cassette 50 is clear of the next one. In this way, it is possible that the rollers 61, 61' can be provided so that they are only spaced about 0.8 inches from each other along the axes of rotation thereof defined by the arbor stubs 58, 58', these axes being indicated by reference numerals 76 and 76' in FIGS. 13 and 14.

The further structure for mounting the cassettes 50 in place comprise the cross bars 77, seen in FIGS. 1, 13, and 14. The cross bars 77 are mounted to the side plates 28, 29 by bolts (not shown) extending through tapped openings 78 (see FIG. 14) in the ends of the cross bars 77, and received in the openings 79 in the side plates 28, 29.

In order to effect installation of the cassettes 50, one of the locator plates 68, together with its associated positioning bars 72, is bolted to the side frame plates 28, 29. Then the cap screws 63 for each cassette 50 are turned down as far as possible, and the cassettes are aligned to fit with the positioning bars 72. The second positioning bars on locators plates 68, 72 are then installed in between the side plates 28, 29 and are bolted into position, thus locking the alignment of the cassettes 50. Next the two center cross bars 77 are bolted into position on the plates 28, 29, and then the cap screws 63 on each cassette 50 are completely backed off so that the spring backer 64 rests on the two center cross bars 77, as illustrated in FIGS. 1 and 14.

It is important that forms of different dimensions can be properly handled by the machine 10. To provide that versatility, the mounting of the cassettes 50 to the main frame side plates 28, 29 accommodates adjustment of the position of at least two of the cassettes 50 along the longitudinal (side) edges of the business form being handled (that is those edges parallel to the direction 14). This adjustability is accommodated by numerous holes 70 provided in the locator plate 68 which are positioned so as to accommodate all normal forms to be handled by a pressure sealer.

Figure 15:
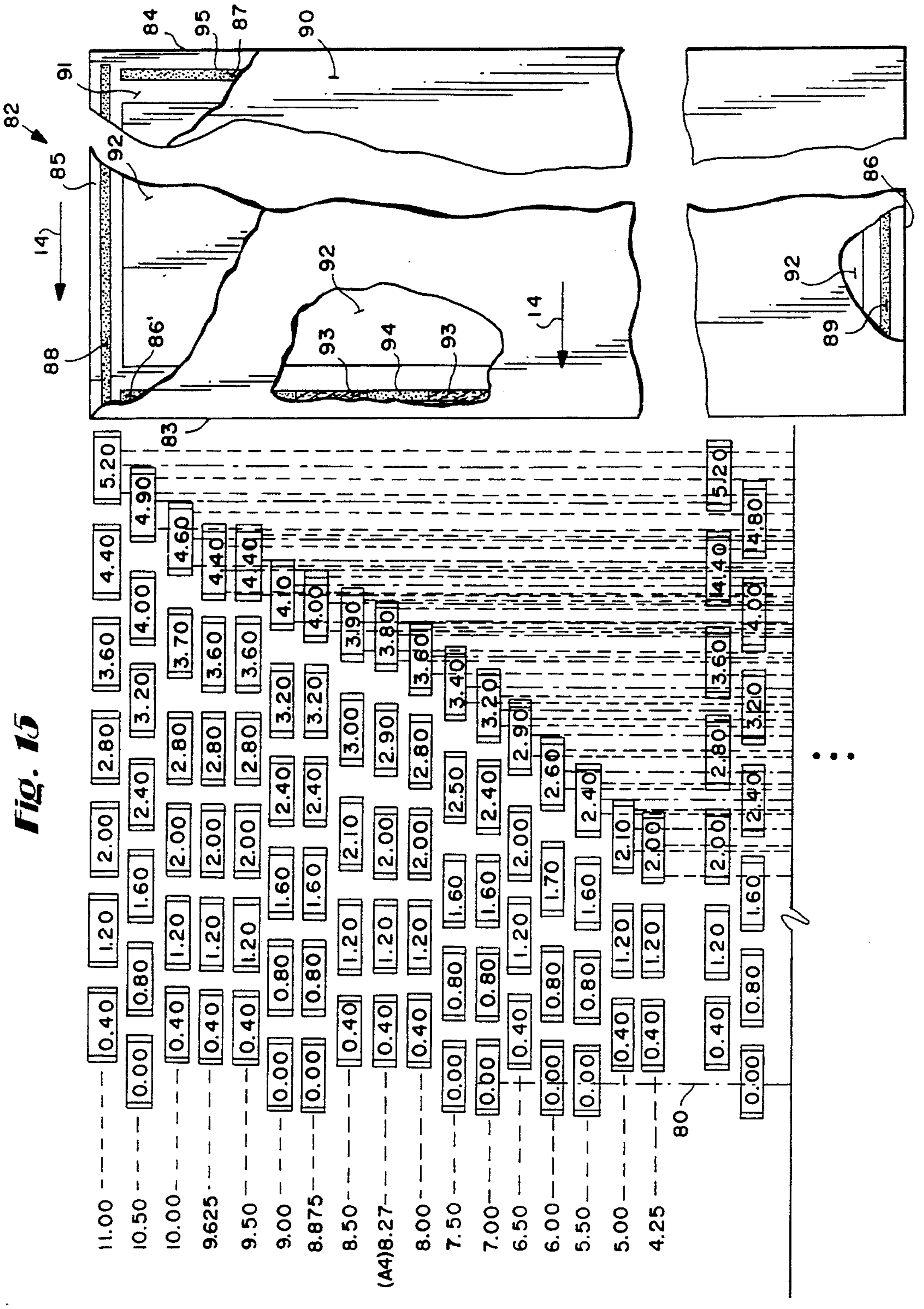
FIG. 15 is a layout chart showing half of one side of the sealing wheel layouts that may be utilized to handle the seventeen standard business form sizes which typically are used in pressure sealing equipment, and also shows, with portions cut away for clarity of illustration, an exemplary business form acted upon by the cassette rollers of the machine of FIG. 1.

FIG. 15 is a schematic illustration showing the glue line and sealing wheel layouts that may be utilized to provide the maximum flexibility that is provided according to the invention (that is the illustration in FIG. 15 shows center lines 80, 80' and it is understood that it is symmetrical about the center lines 80, 80'). Dimension 81 along the axes 76, 76' thereof (see FIG. 7) is less than an inch, and typically between about 0.1 and one inch.

FIG. 15 also illustrates a typical business form 82 that is to be handled by the machine 10, utilizing the idler assembly 11. The business form 82 contains first (leading) and fourth (trailing) edges 83, 84 respectively and second and third (longitudinal, side) edges 85, 86. Each of the edges 83–86 preferably has a continuous strip pattern of pressure sensitive adhesive, 86', 87, 88, and 89, respectively. The strips of adhesive 86' through 89 are preferably applied both to the top sheet 90 and the bottom sheet 91 of the business form 82, although they may be applied only to one sheet under some circumstances. A typical single insert 92 is shown between the sheets 90, 91, and also within the area circumscribed by the adhesive strips 86' through 89. The adhesive of the adhesive strips 86' through 89 preferably is of the type shown in U.S. Pat. No. 4,918,128, or sold commercially by Toppan-Moore under the trade designation "TM 124", and typically requires at least about 100 pounds per lineal inch of pressure to effect its sealing action (and more typically 200 to 250 pounds per lineal inch). This sealing pressure is provided by the springs 62 of each of the cassettes 50.

OPERATION OF MULTIPLE CASSETTE EMBODIMENT

In the utilization of the unit illustrated in FIGS. 1 through 15, to seal a business form 82 having an insert 92, the form 82 is transported by the conveyor means 13 in the direction 14 to the nip between the rollers 15, 61. The positions of the cassettes 50 are adjusted so that rollers 61, 61' of the end cassettes 50 are mounted by the locator plates 68 at positions corresponding to the strips 88, 89 adjacent the longitudinal edges 85, 86 of the form 82. Unused cassettes 50 beyond the business form 82 width can either be removed from the machine or the spring 82 of each can be individually relieved.

The form 82, with the strips 88, 89 thus aligned with rollers 61 of the end cassettes 50, are grasped and driven by the rollers 15, 61 of the nip. All of the rollers 61 of the cassettes 50 between the edges 85, 86 of the business form 82 will come into contact with the leading edge 83 of the business form 82, and because of the spring pressure applied by spring 62 will effect a seal of the adhesive 86' at the portions contacted thereby. However since the rollers 61 will be spaced at least about 0.8 inches from each other along the length of the edge 83, there will be regularly spaced discrete portions of the adhesive 86' along the length of the edge 83—illustrated schematically at 93 in FIG. 15—where sealing does take place, but there will also be the spaces 94 between them that even though there is adhesive 86' thereat no sealing takes place because no roller 61 engaged it.

As the form 82 continues to be driven in the direction 14, those rollers 61 of the cassettes 50 engaging the portion of the business form 82 including the insert 92 will be cammed upwardly by the insert. This upward camming action is allowed because of the particular mounting of the cassettes 50, wherein they are not connected rigidly to the positioning bars 72, and the coil spring 62 is connected in the center of the cassette 50. A small "rocking" action takes place, allowing the insert 92 to pass completely through the nip between the rolls 15, 61 without being crushed or without splaying of the form, until finally once the insert 92 passes the rollers 61 they rock back downwardly and effects sealing—such as at discrete portions 95 (see FIG. 15) of the adhesive strip 87 at spaced discrete portions thereof corresponding to the portions 93 along the front edge 83. Of course since some cassettes 50 were directly aligned with the adhesive strips 88, 89, the longitudinal edges 85, 86 of the form 82 will be sealed together along the entire length thereof (the length of the strips 88, 89).

Of course the same action with respect to the insert and engaging of the leading and trailing edges of the business form 82 takes place with respect to the roller 61' as with respect to the roller 61.

STEAM ROLLER EMBODIMENT

Figure 16:
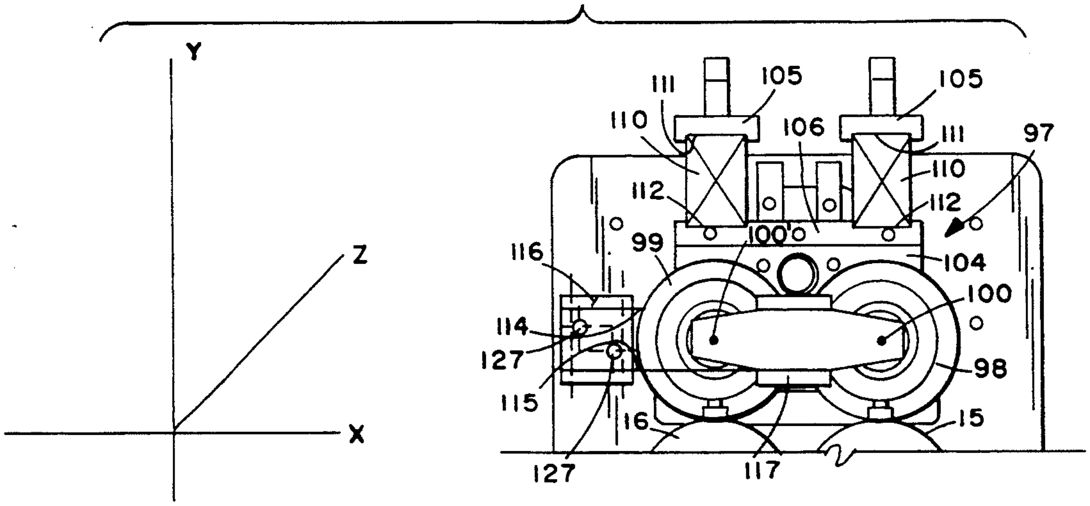
FIG. 16 is a side view, partly in cross-section and partly in elevation, of the steam roller version of pressure seal apparatus according to the invention which may be substituted for the cassette components illustrated at the top of FIG. 1.

The simplified, relatively low cost, steam roller embodiment of idler rollers according to the present invention is shown in FIGS. 16 through 18. The steam roller assembly is shown generally by reference numeral 97 in FIG. 16, and includes third and fourth rollers 98, 99 which cooperate with the rollers 15, 16, respectively to define nips. The rollers 98, 99 also are elongated axially, as seen in FIG. 17, and have an axial length that preferably is the same as the lengths of the rollers 15, 16, i.e. at least about five inches and typically about eleven inches. The rollers 98, are rotatable about axes 100, 100', respectively. The axes 100, 100' are parallel to the axes 17, 18, and aligned with them.

The rollers 98, 99 are of the "dead shaft" construction just like the rollers 15, 16. That is, for example, with respect to the roller 98 illustrated in FIG. 17, the roller 98 is hollow with a central stationary shaft 102 therein, mounted by bolts 103 to side supports 104 of a frame module, which in addition to the side supports 104 includes a T-shaped cross bar 105 (one for each roller 98, 99) and a cross support 106 connected between the side supports 104 of the frame module. Note that the bolts 103 do not interfere with the plates 28, 29 despite their relative positions illustrated in FIG. 17 because the bolts 103 extend through the openings 107 in the plates 28, 29 (see FIG. 2). Bearings 101 engage the interiors of the rollers 98, 99 and the stationary shafts 102 to provide the relative rotational movement of the rollers 98, 99. The T-shaped bars 105 may be connected by bolts to the tops of the plates 28, 29, the bolts passing through the cross portion of the T of each of the supports 105 (see FIGS. 16 and 17) and extending into tapped holes 109 in the top of each of the plates 28, 29 (see FIG. 2).

The cross support 106 and the T-shaped bars 105 are provided with locator means for mounting a plurality of coil springs 110. The locator means preferably comprise circular indentations 111, 112 (see FIGS. 16 and 17) performed in the bars 105 and cross support 106, respectively. A plurality of springs 110 are provided, at least four symmetrically spaced coil springs, and preferably six symmetrically spaced coil springs 110, as illustrated in FIGS. 16 through 18. Of course the springs 110 provide the necessary pressure (of at least about 100 pounds per lineal inch) to effect sealing of two sheet business forms passing between the rolls 15, 98 and 16, 99.

The idler rolls 98, 99 are also preferably mounted so that there is no frictional resistance in X and Y planes. A leaf spring cantilever, comprising a plurality of leaf springs (at least one on each side of the rollers 98, 99) are provided. The leaf springs 114, 115 are mounted by clamps 116, and in a cantilever manner engage the leaf spring bearing blocks 117 which are extensions of the shafts 102, and which are engaged by the bolts 103. The leaf springs 114, 115, and associated clamps 116, and blocks 117 suspend the rolls 98, 99 in the X, Y and Z axes (see FIG. 16), which permit adjustment or movement in the X and Y planes with no frictional resistance. The Y direction is the working direction of the rolls as business forms are processed through the roll nips, while freedom in the X direction permits intentional out of parallel alignment to compensate for the small but finite deflection of two cooperating rolls due to spring loading.

The leaf springs 114, 115 hold the upper roll pair 98, 99 in operating position with respect to the lower roll pair 15, 16 in a frictionless support system. The normal force loading on the rollers is on the order of 150–200 lbs./linear inch (the sealing pressure on the forms), with a net sealing width of the rollers 98, 99 of 11.25 inches. Thus the normal force is about 1500 lbs. When a document comes between the rolls 98, 15, this normal force vectors into horizontal and vertical components, with typical side loading of 1150 lbs. times the target angle from true vertical at the position where the document enters the nip (e.g. 6 degrees), and thus a resultant horizontal load of about 250 lbs. This would be a difficult transient load to handle, and would be noisy, prone to wear, and would undesirably decrease the effective vertical (sealing) loading. However, with the leaf spring system, this horizontal load component is taken easily by the column stiffness of the four-leaf system, and no external load beyond that loaded into the four leaf spring blades is carried by the system.

Also, the leaf spring system allows compensation adjustment to fine tune the accuracy of the roll to roll compliance. Using the leaf spring mountings 116, 117, it is a simple matter to intentionally through the cooperating rolls 98, 15, etc. slightly out of parallel so that load deflection is compensated by forcing the rolls to comply with each other.

According to the invention it is also possible to "stop" the idler rolls 98, 99 axially. By restraining the spring pressed rolls 98, 99 from closing at full force against the stationary rolls 15, 16 the entry angle of business forms to the nip formed by the rolls 15, 98 can be reduced, and accordingly the power requirement to drive the roll system can also be reduced. This positive stop feature is provided, for each of the rolls 98, 99, by a stop assembly 120 (see FIG. 17) connected to one of the side supports 42, and limiting its movement by abutting engagement with a flat top screw 121 extending upwardly from the collar 44. This simple and inexpensive locking cap screw limiter stop system has the major benefits of: reducing the transient torque requirement to fee a document set into the nip between the rolls, permitting a smaller drive motor; reducing gear wear and eliminating fret-corrosion of the rolls since they do not come into metal-to-metal contact with each other; and reducing processing noise.

Also as seen in FIG. 17, loading collars 124, 125 are provided for loading the bearings 101 surrounding the dead shaft 102. The dead shaft 102 diameter is uniform (e.g. 1.181 inches) and the O.D. of the bearings may be 2.4401 inches, while the O.D. of the roll 98 is 3.183 inches. The bearings 101 are 8.075 inches apart, and there is a cantilever section of the roll 98 beyond (outside of) each bearing of about 1.575 inches. Compliance error between the cooperating rolls 98, 15, etc., must be less than 0.0005 inches in order to maintain effective seal pressure distribution. By using the shell roll 98 over a dead shaft 102, it is possible to place, by calculated design, each of the bearings 101 inside the roll 98 so that deflection is distributed equally over the fuller roller length.

As seen in FIG. 16, four 10–32 screws 127, two in each anchor block 116, mount the entire upper roll suspension in place, allowing low cost, low weight, reduced roll grinding accuracy, and service complexity, and providing easy convertibility of the system between the "steamroller" and "cassette" embodiments.

The machine 10 can easily be converted from the cassette version to the steam roller version merely by moving the main frame means including the side plates 28, 29, via the rails 35, out of the housing 12, and unbolting one set of components and bolting in the others, into the main frame plates 28, 29.

It will thus be seen that according to the present invention a simple yet effective apparatus, that is extremely versatile, is provided, as well as a method for sealing business forms having inserts, and a business form with pressure sensitive adhesive, and inserts, so formed. While the invention has been herein shown and described in what is presently conceived to be the most practical and preferred embodiments thereof, it will be apparent to those of ordinary skill in the art that many modifications may be made thereof within the scope of the invention, which scope is to be accorded the broadest interpretation of the appended claims to as to encompass all equivalent structures, processes, and products.

What is claimed is:

1. Apparatus for sealing pressure sensitive adhesive patterns on business forms, comprising:

first and second rollers mounted for rotation about substantially parallel first and second stationary axes, respectively, said rollers each having an axial length of at least about five inches;

means for rotating said first and second rollers about said first and second axes;

main frame means for mounting a plurality of idler rollers in association with said first and second rollers so that said idler rollers cooperate with said first and second rollers to apply a compressive pressure to business forms passing between them of at least about 100 pounds per lineal inch;

a first idler roller assembly for cooperation with said main frame means, comprising: third and fourth rollers mounted for rotation about substantially parallel third and fourth axes, which are parallel to first and second axes, each of said third and fourth rollers having an axial length of at least about five inches; and spring means for applying spring pressure to said third and fourth rollers which provides said compressive pressure business forms;

a second idler roller assembly for cooperation with said main frame means, said second idler roller assembly comprising: at least three narrow width roller couples, the rollers of said narrow width roller couples being mounted on common fifth and sixth axes, parallel to said first and second axes, said roller couples being spaced along said fifth and sixth axes; spring means for applying spring pressure to each of said roller couples which provides said compressive pressure to business forms; and means for mounting said couples so that a roller from each of said plurality of couples cooperates with each of said first and second rollers, and so that business forms with inserts, labels, windows, or other surface interruptions are sealed without damage to the business forms;

means for mounting either of said first idler roller assembly or said second idler roller assembly, and said main frame means, in cooperation with said first and second rollers; and wherein said second idler roller assembly narrow width roller couples each comprises: a center body defining a pair of ball bearing races; a pair of side plates; and a pair of narrow width ball bearing rollers mounted within said races and mounted for rotation about said fifth and sixth axes by arbors mounted to said side plates.

2. Apparatus as recited in claim 1 further comprising conveyor means for conveying business forms into operative association with said first roller.

3. Apparatus as recited in claim 1 further comprising housing means for housing said first second rollers, rotating means, main frame means, and either said first or second idler roller assembly, therewithin in one or more discrete units; and further comprising means for mounting at least one of said discrete units within said housing means for movement into and out of said housing means.

4. Apparatus as recited in claim 3 wherein said discrete unit mounting means comprises a plurality of bushings stationarily connected to said housing means, and a plurality of rails mounted in association with said bushings for linear movement with respect thereto, and connection means for connecting said one or more discrete units to said rails for movement therewith.

5. Apparatus as recited in claim 4 wherein said rotating means includes a motor; and wherein said motor is stationarily mounted in said housing means; and wherein said first and second rollers, main frame means, and either said first or second idler roller assembly comprises a discrete unit.

6. Apparatus as recited in claim 5 wherein said rails are circular in cross section, and wherein said plurality of bushings comprises, for each rail, an open top, semicircular bushing.

7. Apparatus as recited in claim 1 wherein said main frame means comprises first and second side plates; and wherein said first idler roller assembly further comprises a generally T-shaped bar associated with each of said third and fourth rollers, and extending between said first and second side plates; a frame module connected to both said third and fourth rollers for mounting them for rotation about said third and fourth axes, and including a pair of side supports and a cross support; and locating means formed in said T-shaped bars and said frame module cross support for receiving said spring means therein.

8. Apparatus as recited in claim 1 wherein said first and second rollers are hollow; and wherein said first and second rollers are mounted for rotation about said first and second axes by bearing means located within said hollow first and second rollers, and a non-rotatable support shaft also within each of said first and second rollers and engaging said bearing means.

9. Apparatus as recited in claim 8 wherein said rotating means comprise a gear connected to at least one end of each of said first and second rollers, a motor, and gearing means interconnecting said motor and said roller gears.

10. Apparatus as recited in claim 8 wherein said first idler roller assembly further comprises a frame module comprising a pair of side supports; and wherein said third and fourth rollers are hollow; and wherein said third and fourth rollers are mounted for rotation about said third and fourth axes by a stationary shaft mounted to said side supports and disposed within each of said hollow third and fourth rollers, and bearing means disposed within said hollow third and fourth rollers between said stationary shafts and said third and fourth rollers.

11. Apparatus as recited in claim 1 wherein said first idler roller assembly further comprises a frame module comprising a pair of side supports; and wherein said third and fourth rollers are hollow; and wherein said third and fourth rollers are mounted for rotation about said third and fourth axes by a stationary shaft mounted to said side supports and disposed within each of said hollow third and fourth rollers, and bearing means disposed within said hollow third and fourth rollers between said stationary shafts and said third and fourth rollers.

12. Apparatus as recited in claim 1 wherein each of said roller couples further comprises means for defining a spring mount in said center body at a central portion thereof between said races; and means for defining a bore extending into said center body at said spring mount in a direction perpendicular to said fifth and sixth axes for receipt of a screw therein; and wherein said spring means comprise a coil spring mounted in said spring mount with a first end thereof abutting said center body, a separate coil spring for each spring mount, disposed around said screw, and a spring backer engaging said coil spring on a second end thereof, opposite said first end, said screw passing through said spring backer; and wherein said frame means engages said spring backer.

13. Apparatus as recited in claim 12 wherein said means for mounting said couples comprises, or each couple, first and second position bars engaging opposite ends of said center body to prevent substantial movement thereof in a first direction perpendicular to said fifth and sixth axes, but to allow movement in a second direction perpendicular to said fifth and sixth axes; a pair of cross bars engaging said spring back plate so that movement in said second direction will be against the bias of said coil spring; and means for connecting said position bars and said cross bars to said main frame means.

14. Apparatus as recited in claim 1 wherein each of said narrow width rollers has an axial extent of less than one inch.

15. Apparatus as recited in claim 1 wherein said second idler roller assembly further comprises means for mounting said second idler roller assembly to said main frame means so that the positions of at least two of said narrow width roller couples are adjustable along said fifth and sixth axes so as to allow proper positioning of said at least two couples along the edges of business forms in the direction of travel through said apparatus.

16. Apparatus for sealing pressure sensitive adhesive patterns on business forms, comprising:

first and second stationary axes rollers mounted for rotation about substantially parallel first and second stationary axes, respectively;

main frame means for mounting a plurality of idler rollers in association with said first and second rollers so that said idler rollers cooperate with said first and second rollers to apply a compressive pressure to business forms passing between them of at least about 100 pounds per lineal inch;

an idler roller assembly mounted on said main frame means and comprising: at least three narrow width roller couples, the rollers of said narrow width couples being mounted on common third and fourth axes, parallel to said first and second axes, said roller couples being spaced along said third and fourth axes; spring means for applying spring pressure to each of said roller couples which provides said compressive pressure to business forms; and means for mounting said couples so that a roller from each of said plurality of couples cooperates with each of said first and second rollers, and so that business forms with inserts, labels, windows, or other surface interruptions without damage to the business forms;

means for mounting said idler roller assembly to said main frame means so that the positions of at least two of said narrow width roller couples are adjustable along said third and fourth axes so as to allow proper positioning of said at least two couples along the edges of business forms in the direction of travel through said apparatus; and wherein said narrow width roller couples each comprising: a center body defining a pair of ball bearing races; a pair side plates; and a pair of narrow width ball bearing rollers mounted within said races and mounted for rotation about said third and fourth axes by arbors mounted to said side plates.

17. Apparatus as recited in claim 16 wherein each of said roller couples further comprises means for defining a spring mount in said center body at a central portion thereof between said races; and means for defining a bore extending into said center body at said spring mount in a direction perpendicular to said third and fourth axes for receipt of a screw therein; and wherein said spring means comprise a coil spring mounted in said spring mount with a first end thereof abutting said center body, a separate coil spring for each spring mount, disposed around said screw, and a spring backer engaging said coil spring on a second end thereof, opposite said first end, said screw passing through said spring backer; and wherein said frame means engages said spring backer.

18. Apparatus as recited in claim 17 wherein said means for mounting said couples comprises, for each couple, first and second position bars engaging opposite ends of said center body to prevent substantial movement thereof in a first direction perpendicular to said third and fourth axes, but to allow movement in a second direction perpendicular to said third and fourth axes; a pair of cross bars engaging said spring back plate so that movement in said second direction will be against the bias of said coil spring; and means for connecting said position bars and said cross bars to said main frame means.

19. Apparatus as recited in claim 16 wherein each of said narrow width rollers has an axial extent of less than one inch.

20. A method of effecting sealing of perpendicular first and second edges of a business form having top and bottom sheets, and an insert between the top and bottom sheets, and pressure sensitive adhesive strips disposed along the first and second perpendicular edges of the top and bottom sheets, and along a third edge parallel to the second edge, in a single pass through a machine having at least three narrow width rollers mounted for rotation about an axis parallel to the first edge of the business form, the rollers spaced from each other along the axis of rotation, and two of the roller comprising end rollers spaced apart from each other along the axis a distance substantially equal to the length of the first edge between the second and third edges, comprising the steps of:

(a) feeding the business form in a first direction, parallel to the second and third edges, so that the first edge of the business form is engaged by the at least three rollers;

(b) applying pressure to the rollers so that they effect sealing of the pressure sensitive adhesive of the business form wherever the rollers engage the business form;

(c) aligning the business form with respect to the rollers so that the end rollers engage the second and third edges of the form and effect pressure sealing along the entire length thereof as the form passes in the first direction; and (d) causing the rollers, after engaging the first edge of the form and effecting sealing thereof where engaged by a roller, to rock out of the way of the form insert if a portion of the form containing the insert engages the roller, so that the insert and the form at the insert will not be crushed.

21. A method as recited in claim 20 wherein step (b) is practiced by applying a pressure of at least one hundred pounds per lineal inch.

22. A method as recited in claim 20 wherein there are a plurality of rollers between the end rollers.

23. A method as recited in claim 22 wherein the business form has a fourth edge, parallel to the first edge, and pressure sensitive adhesive is disposed between the first and second sheets at the fourth edge, and comprising the further step (e) of causing the rollers, after being rocked out of the way by the form insert, to engage the fourth edge of the form and effect sealing thereof where engaged by a roller.

24. Apparatus for sealing pressure sensitive adhesive patterns on business forms, comprising:

first and second stationary axes rollers mounted for rotation about substantially parallel first and second stationary axes, respectively;

main frame means for mounting a plurality of idler rollers in association with said first and second rollers so that said idler rollers cooperate with said first and second rollers to apply a compressive pressure to business forms passing between them of at least about 100 pounds per lineal inch;

an idler roller assembly mounted on said main frame means and comprising: at least three narrow width roller couples, the rollers of said narrow width couples being mounted on common third and fourth axes, parallel to said first and second axes, said roller couples being spaced along said third and fourth axes; spring means for applying spring pressure to each of said roller couples which provides said compressive pressure to business forms; and means for mounting said couples so that a roller from each of said plurality of couples cooperates with each of said first and second rollers, and so that business forms with inserts, labels, windows, or other surface interruptions without damage to the business forms;

means for mounting said idler roller assembly to said main frame means so that the positions of at least two of said narrow width roller couples are adjustable along said third and fourth axes so as to allow proper positioning of said at least two couples along the edges of business forms in the direction of travel through said apparatus; and wherein each of said couples comprises a cassette, said cassette comprising: a center body defining a pair open ended ball bearing races along a first side thereof, and a spring mount along the center line of a second side thereof opposite said first side; a pair of side plates; and a pair of narrow width ball bearing rollers; and a pair of arbors mounted to said side plate and engaging said ball bearing rollers to mount them within said races for rotation about parallel axes, said rollers extending downwardly from said center body and side plates.

25. Apparatus as recited in claim 24 wherein each of said cassettes further comprises means defining a bore extending into said center body at said spring mount in a direction perpendicular to said parallel axes.

26. Apparatus as recited in claim 25 wherein each of said cassettes further comprises a screw extending into said bore; a coil spring mounted in said spring mount with a first end thereof abutting said center body, and disposed around said screw; and a spring backer engaging said coil spring on a second end thereof, opposite said first end, said screw passing through said spring backer.

27. Apparatus as recited in claim 26 wherein each said cassette bore passes completely through said center body and is screw threaded.

28. Apparatus as recited in claim 25 wherein said cassette center body and said plates have a generally quadrate shape in plan view.

* * * * *